United States Patent [19]

Morita et al.

[11] 4,069,979
[45] Jan. 24, 1978

[54] METHOD AND APPARATUS FOR BREAKING UP AND SEPARATING WASTE GLASS TO OBTAIN CULLET

[75] Inventors: Kaneji Morita; Akio Sugie, both of Nishinomiya; Kunio Ishioka, Kobe, all of Japan

[73] Assignees: Yamamura Glass Kabushiki Kaisha; Junzo Shimoiizaka, both of Japan

[21] Appl. No.: 741,490

[22] Filed: Nov. 12, 1976

[51] Int. Cl.² .......................................... B02C 19/12
[52] U.S. Cl. ........................................ 241/5; 241/24
[58] Field of Search ............... 241/5, 24, 26, 69, 74, 241/79, 81, 91, 96, 99, 172, 176, 177, 178, 183, 278 A, 284; 209/288, 289

[56] References Cited

U.S. PATENT DOCUMENTS

| | | | |
|---|---|---|---|
| 2,820,595 | 1/1958 | Schumacher | 241/99 |
| 3,491,958 | 1/1970 | Zucchini | 241/91 |
| 3,946,953 | 3/1976 | Hato | 241/99 |

*Primary Examiner*—Granville Y. Custer, Jr.
*Attorney, Agent, or Firm*—Holman & Stern

[57] ABSTRACT

A method of breaking up and separating waste glass with use of a lattice comprising a grizzly made up of parallel bars arranged at a spacing smaller than the minimum width of projection of three-dimensional extraneous matter and auxiliary parallel bars disposed over one surface of the grizzly and arranged at right angles to the bars, the diagonal dimension of the openings of the lattice being smaller than the maximum width of projection of planar extraneous matter, the method being characterized by dropping the waste glass onto the grizzly surface of the lattice to break up the waste glass under gravity and to separate the waste glass into an undersize portion passing through the lattice and an oversize portion, and repeatedly subjecting the oversize portion to the aforesaid operation to obtain cullet as an undersize material and to remove the extraneous matter from the waste glass as an oversize material. The lattice is in the form of a rotatable drum with the grizzly positioned on the inner side of the its peripheral portion. The drum-shaped lattice has lifter plates attached to its inner periphery and an inlet for the waste glass and an outlet for the extraneous matter at its opposite ends respectively.

1 Claim, 8 Drawing Figures

METHOD AND APPARATUS FOR BREAKING UP AND SEPARATING WASTE GLASS TO OBTAIN CULLET

BACKGROUND OF THE INVENTION

The present invention relates to a method and an apparatus for breaking up and separating waste glass to obtain cullet.

Recycled waste glass contains caps and the like of glass bottles and may further contain empty bottles for beverages. In recent years, many of caps are made of aluminum, while some are made of iron, synthetic resin, cork, etc. Empty cans are generally aluminum and iron cans. When waste glass containing such extraneous matter is used as cullet, the glass product obtained contains bubbles and unmelted substances, i.e. so-called "stones," and involves changes in color or transparency due to the presence of the extraneous matter. These objections reduce the strength and apprearance of the product, seriously impairing commercial value of the product.

Accordingly the extraneous matter must be removed to the greatest possible extent. However, the extraneous matter varies greatly in shape and properties. Moreover, regardless of whether the waste glass has been fractured or not, some kinds of extraneous matter may not differ from the waste glass in shape, size or specific gravity. Thus the undesirable matter is not readily separable by the conventional methods such as screening, washing with water, sink and float separation, etc., with the exception of magnetic materials which are magnetically separable. In fact, the conventional methods give very low yields. For this reason, for the preparation of cullet, extraneous matter is usually removed from the waste glass by manually roughly breaking waste glass, separating off soil, sand, mud and like fine particles by screening, washing the oversize pieces with water to remove paper, cork and synthetic resin extraneous materials, and further manually removing caps, empty cans and other extraneous pieces while magnetically separating off magnetic material. However, the usual method involves the cumbersome and inefficient manual separation step and still permits a large amount of extraneous matter to remain in the waste glass.

On the other hand, because finely divided glass produces bubbles when melted in the furnace and because of the necessity of assuring effective and efficient operation of the optical color separator used to obtain good cullet, glass pieces must have sizes within a specified range (e.g. −20 to +5 mm). For this purpose, waste glass is conventionally broken up with use of jaw crushers and impeller breakers for ore and stone, instead of resorting to an inefficient manual breaking procedure. However, the operation with use of such crushers tends to cause abrasion and compression, consequently impairing the quality of cullet or reducing the yield.

SUMMARY OF THE INVENTION

An object of this invention is to provide a method and an apparatus for breaking up and separating waste glass by which various kinds of extraneous matter can be removed from the waste glass efficiently by a simple procedure to obtain a high yield of cullet in broken pieces having sizes within the desired range.

Another object of this invention is to provide a simple, compact and automatic apparatus by which a large amount of waste glass can be broken up and separated repeatedly, continuously and efficiently with use of a lattice having two different surface levels so as to remove extraneous matter from the waste glass with improved efficiency and to break up the waste glass to pieces of cullet with improved effectiveness.

This invention has been accomplished based on our findings described below.

First, the extraneous matter contained in waste glass in not brittle, is lightweight and involves small energy of impact when falling, so that the extraneous matter remains unbroken in shape when dropped under gravity. Grizzlies comprising parallel bars arranged at a specified spacing are of such nature that they permit passage of planar pieces such as glass pieces (including extraneous pieces of planar shape such as pull-top pieces) but retain thereon three-dimensional extraneous matter. Further when brittle glass is dropped onto a grizzly, the bars produce concentrated stress in the glass, allowing greater pieces of glass to break up under gravity, whereas smaller glass pieces which involve small energy of impact remain unbroken. When dropped onto the grizzly and thereby broken, waste glass can be separated into glass pieces as an undersize material and extraneous matter as an oversize portion. Thus cullet is obtainable by a simplified procedure free of excessive breaking, while permitting extraneous matter to remain separate and loose without engaging glass pieces. Consequently, the use of the grizzly achieves improved yields and facilitates after treatment (such as sink and float separation for the removal of the remaining extraneous matter and color separation) required for the preparation of good cullet.

Second, although extraneous matter which is three-dimensional relative to the glass pieces to be recovered as cullet is removable by suitably determining the spacing between the bars of the grizzly, it is difficult to remove aluminum pull-top pieces (removed from containers to open them) which are nearly as planar as glass pieces, flat covers of cup-shaped containers, synthetic resin caps, aluminum rings remaining on the mouth of glass bottles for alcoholic drinks, etc. Accordingly, these extraneous matter must be removed usually by after treatment. However, when waste glass is dropped onto a lattice comprising the grizzly and auxiliary parallel bars disposed over the non-breaking surface thereof and arranged at right angles to the parallel bars of the grizzly, extraneous matter of planar shape is also removable without impairing the breaking and separating ability of the grizzly.

This invention provides a method of breaking up and separating waste glass with use of a lattice comprising a grizzly made up of parallel bars arranged at a spacing smaller than the minimum width of projection of three-dimensional extraneous matter and auxiliary parallel bars disposed over one surface of the grizzly and arranged at right angles to the bars, the diagonal dimension of the openings of the lattice being smaller than the maximum width of projection of planar being smaller than the maximum width of projection of planar extraneous matter, the method being characterized by dropping the waste glass onto the grizzly surface of the lattice to break up the waste glass on the grizzly under gravity and to separate the waste glass into an undersize portion of the waste glass passing through the lattice and an oversize portion containing large pieces of waste glass and various kinds of unbroken extraneous matter, and repeatedly subjecting the oversize portion to the aforesaid operation to obtain cullet as an undersize material and to remove the extraneous matter from the waste glass as an oversize material.

According to the method of this invention, the surface of the grizzly is positioned above the auxiliary parallel bars, serving as a first surface for breaking up the waste glass under gravity. Large pieces of waste glass involving great energy of falling impact are efficiently broken by the grizzly surface, whereas the smaller the pieces, the smaller is the energy of falling impact and therefore the less likely it is for them to be broken. The surface of the auxiliary parallel bars below the grizzly surface provides a second surface for breaking up the waste glass under gravity. Many pieces of waste glass first fall onto the grizzly surface and then onto the auxiliary parallel bars. At this time, since the energy of falling impact involved has already been almost nullified when the glass pieces strike the grizzly surface, relatively large pieces of glass alone are broken on the auxiliary parallel bars. On the other hand, the glass pieces falling directly onto the auxiliary bars are broken to the same extent as on the grizzly surface. Thus the lattice assures a higher breaking efficiency than when the grizzly alone is used. Moreover, the provision of the breaking surfaces at two different levels prevents excessive breaking of small glass pieces.

The openings of lattice defined by the grizzly bars and auxiliary parallel bars regulate the passage of waste glass and extraneous matter, such that planar glass pieces and extraneous matter which are passable through the grizzly but larger than the diagonal dimension of the openings are retained as an oversize portion. Consequently, such glass pieces are subjected to the breaking action again, while the extraneous matter still remains as an oversize portion. Thus the planar extraneous matter is removable as an oversize portion and the maximum size of the glass pieces obtainable as an undersize portion is controllable by suitably determining the size of the lattice openings. The extraneous matter which is not brittle remains unbroken and is protected from the falling glass pieces by the parallel bars of the grizzly because they are retained on the auxiliary bars as positioned between the grizzly bars. Accordingly rings and pull-top pieces are retained on the lattice in shape without being collapsed.

The method carried out with the use of the lattice gives cullet pieces within the desired size range with high efficiency in high yields, removes extraneous matter to a greatly increased extent, and facilitates after treatment such as separation of the remaining extraneous matter and color separation to produce satisfactory cullet.

Basically, the apparatus of this invention comprises the above-mentioned lattic disposed in the passage for dropping the waste glass. The lattice is in the form of a rotatable drum, with the grizzly defining the inner periphery of the drum, having lifter plates attached to the inner periphery, a glass inlet at one end of the drum and an outlet for extraneous matter at the other end thereof.

With the present apparatus, waste glass is continuously charged from the inlet. The waste glass is progressively sent toward the outlet while being repeatedly raised by the lifter plates and dropped on the grizzly surface. During this operation, the waste glass is broken up, and the glass pieces having sizes within the desired range pass through the lattice and recovered as cullet. The remaining extraneous matter is continuously forced out from the outlet and thereby separated from the cullet.

Accordingly a large amount of waste glass can be repeatedly broken up and separated with use of a single lattice by a continuous, automatic and therefore efficient operation.

The drum-type lattice is installed in an inclined position or is made in a tapered form to facilitate the movement of the waste glass and extraneous matter toward the outlet, thereby ensuring a smooth operation, while preventing extraneous matter from being collapsed and rendered passable through the lattice.

Other objects and features of this invention will become apparent from the following discription with reference to the accompanying drawings.

DESCRIPTION OF THE PREFERRED EMBODIMENTS

Figure 1:
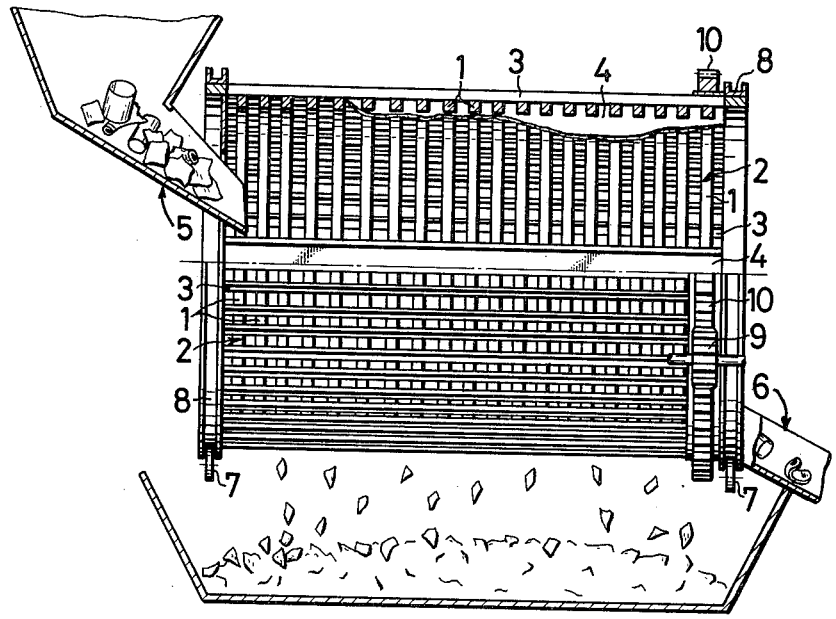
FIG. 1 is a front view showing a preferred embodiment of the apparatus of this invention, one half of the same being in vertical section.

The apparatus of this invention comprises a lattice including a grizzly 2 made up of parallel bars 1 arranged at a spacing smaller than the minimum width of projection of three-dimensional extraneous matter such as empty cans, and auxiliary parallel bars 3 disposed over the grizzly 2 and arranged at right angles to the bars 1. The diagonal dimension of the openings of the lattice is smaller than the maximum width of projection of planar extraneous matter such as pull-top pieces, rings, flat caps, covers, etc. As seen in FIGS. 1 to 5, the lattice is in the form of a rotatable drum with the grizzly 2 defining the inner periphery of the drum. Lifter plates 4 are attached to the inner periphery of the drum. The drum has an inlet 5 for waste glass and an outlet 6 for extraneous matter at the opposite ends respectively.

Figure 2:
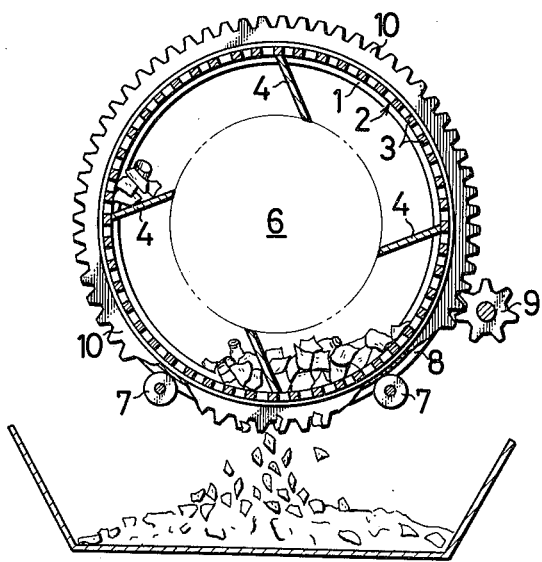
FIG. 2 is a cross sectional view of the same.
Figure 3:
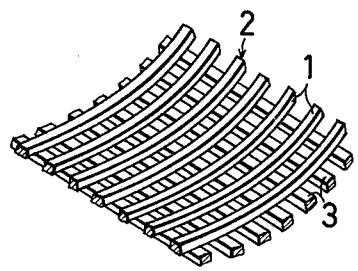
FIG. 3 is a fragmentary perspective view showing the same on an enlarged scale.
Figure 4:
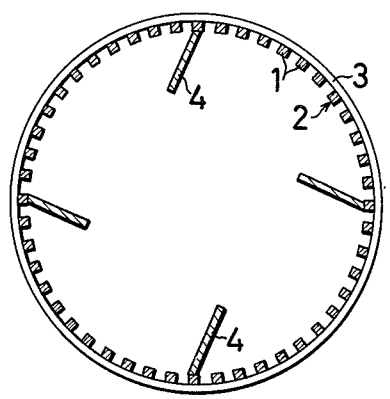
FIG. 4 is a cross sectional view of a modified embodiment in which the bars of a grizzly extend in a different direction.
Figure 5:
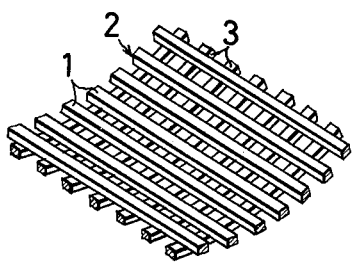
FIG. 5 is a fragmentary perspective view of the same on an enlarged scale.

With the embodiment shown in FIGS. 1 to 3, the bars 1 of the grizzly 2 extend in the direction of rotation of the drum, while with the embodiment shown in FIGS. 4 and 5, the bars 1 extend at right angles to the direction of rotation of the drum. FIG. 1 shows guide rollers 7, guide rails 8, a drive gear 9 and a driven gear 10.

When the drum-shaped lattice is rotated with waste glass placed therein, the glass is repeatedly raised by the lifter plates 4 and then dropped onto the grizzly 2. The larger the falling glass piece, the greater is the energy of impact involved and the more likely is the glass piece to be subjected to concentrated stress on striking the bar 1. Thus large glass pieces are readily breakable, whereas small glass pieces are less breakable. The planar glass pieces which have such shape originally or which have been so shaped by being broken, even if the maximum width of projection thereof is larger than the spacing between the grizzly bars 1, pass through the grizzly 2 easily and fall onto the auxiliary bars 3 because the minimum width of projection thereof is smaller enough than the spacing between the grizzly bars 1. Among these glass pieces, those having a maximum width of projection which is smaller than the spacing between the auxiliary bars 3 rapidly pass between the bars 3, namely through the openings of the lattice.

Figure 6:
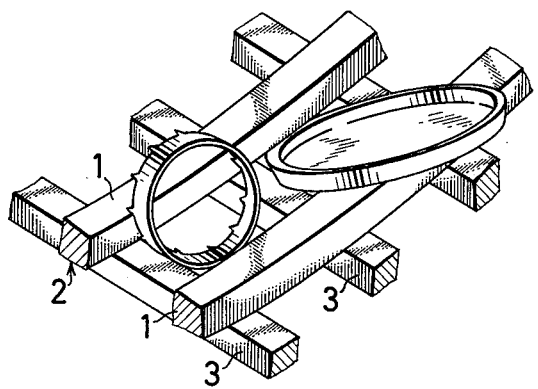
FIG. 6 is a fragmentary perspective view on an enlarged scale illustrating how planar pieces of extraneous matter are separated.

On the other hand, pieces of extraneous matter fall at a relatively small velocity and involve smaller energy of falling impact. Because of their elastic nature, light-weightness and characterisitc shapes, they will not be broken nor be collapsed upon striking the lattice, while three-dimensional articles such as empty cans will not pass through the grizzly 2. Planar pieces such as rings, pull-top pieces, flat caps or covers, etc. tend to readily pass through the grizzly 2 and are positioned on the auxiliary bars 3. However, their posture is governed by the parallel bars 1 of the grizzly 1 that the maximum width of projection thereof is at right angles to the auxiliary bars 3 as seen in FIG. 6. Consequently they are retained on the bars 3 and unable to pass through the openings of the lattice.

Thus extraneous pieces of three-dimensional shape as well as of planar shape remain within the lattice as an oversize portion and are repeatedly raised and dropped by the lifter plates 4 along with coarse pieces of waste glass. During this process, brittle waste glass alone is broken up to smaller pieces, which passes through the lattice openings. The waste glass therefore progressively reduces in amount. Finally the extraneous matter alone remains. As a result, the waste glass is made into pieces of cullet not larger than a specified size, with the extraneous matter removed therefrom.

Because the remaining extraneous matter involves small energy of impact when falling, has an elastic nature and is protected from the impact exerted by falling glass pieces by being positioned between the parallel bars 1 of the grizzly 2, it remains in the form of separate pieces without being collapsed. Thus a very high proportion of the extraneous matter remains within the lattice. Moreover, extraneous pieces will not engage and retain glass pieces. Small pieces of glass broken by the first fall onto the bars 1 of the grizzly fall onto the auxiliary bars 3 secondly. At this second fall the small pieces of glass will not be further broken because of less falling impact. Glass pieces which are of such sizes that they need not be further broken strike the auxiliary bars 3 with their planar direction positioned vertically by being guided by the grizzly bars 1 and readily pass through the bars 3, so that they are less likely to be broken by the bars 3. Accordingly glass pieces are broken up to sizes within a narrow range without entailing noticeable formation of fines or very small pieces as is the case with use of the grizzly alone.

The auxiliary parallel bars 3 will not break the glass pieces other than those of large sizes falling directly thereagainst. The combination of the bars 3 and the grizzly in the form of a lattice having two different surface levels achieves the synergic effect of removing the extraneous matter with greatly improved efficiency, without impairing the function of the grizzly which gives broken pieces in a narrow size range, while protecting the extraneous matter from falling glass pieces. The effect to remove the extraneous matter can be ensured to the greatest extent by minimizing the spacing between the bars 3 within the range allowable in view of the size of the pieces of cullet to be obtained.

With the embodiment shown in FIGS. 1 to 3, glass pieces tend to slip on the grizzly 2 and are likely to be subjected to an abrasive breaking action, whereas in the case of the embodiment shown in FIGS. 4 and 5, glass pieces are less likely to slip by being caught by the parallel bars 1 and will not be broken by abrasion.

Figure 7:
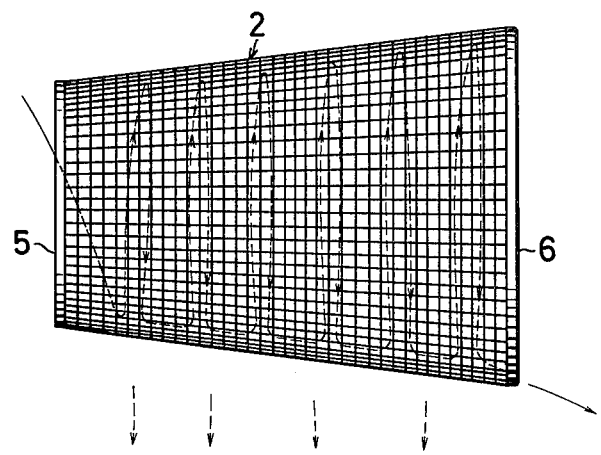
FIG. 7 is a front view showing an embodiment of the tapered drum type.
Figure 8:
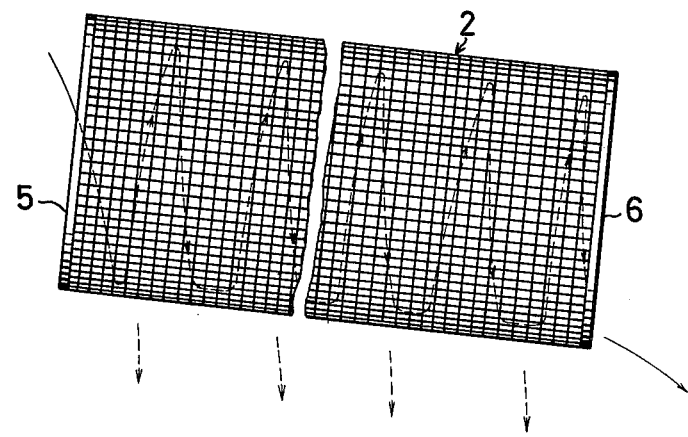
FIG. 8 is a front view showing an embodiment of the inclined drum type.

FIG. 7 shows a lattice in the form of a tapered drum, while FIG. 8 shows a drum-shaped lattice as installed in an inclined position. The inclination of the grilzly surface causes the extraneous matter to progressively move toward the outlet 6, automatically running off the extraneous matter. With the lattice of the tapered drum type shown in FIG. 7, the bars 1 or 3 extending axially thereof have a width progressively increasing from one end to the other so as to maintain a uniform spacing between the bars in the axial direction.

Although the auxiliary bars 3 will not positively exert a breaking action, excessive breaking can be eliminated more effectively when they are made of elastic material such as steel strips.

Given below are experiments conducted according to this invention.

EXPERIMENT 1

A rotatable drum-shaped lattice, 1.5 m in diameter and 1.5 m in length, was used, the lattice comprising a grizzly made up of 20-mm-square parallel bars and 20-mm-wide steel strips serving as auxiliary bars and disposed over the grizzly. The lattice had openings, 20 mm × 20 mm, and was equipped with four lifter plates and driven at 14 r.p.m. The effective height of the apparatus the waste glass was dropped was about 1.3 m.

Waste glass (97.34 kg) consisting of 99.38% by weight of glass bottles and sheet glass pieces and 0.62% by weight of caps, pull-top pieces and like extraneous matter was placed into the apparatus, and the apparatus was driven for 1.5 minutes. Table 1 shows the size distribution of the undersize material obtained and the amount of the extraneous matter contained therein, in comparison with those of the starting test material. The extraneous matter in the undersize material was a planer small pull-top piece.

Table 1

| Size (mm) | Test material Whole | Test material Extraneous matter | Undersize material Whole | Undersize material Extraneous matter |
| --- | --- | --- | --- | --- |
| +40 | 18.4 | 0.17 | — | — |
| −40 to +20 | 50.7 | 0.45 | — | — |
| −20 to +10 | 23.1 | 0.0008 | 72.5 | 0.0008 |
| −10 to +5 | 4.9 | — | 19.4 | — |
| −5 | 2.9 | — | 8.1 | — |
| Total (%) | 100.0 (97.34 kg) | 0.62 (602.7 g) | 100.0 (94.81 kg) | 0.0008 (0.8 g) |

The amount of the undersize material is (94.81/97.34) × 100 = 97.4 wt.%.

The amount of the glass recovered when the −20 mm to +5 mm portion was collected as the final product is {0.974 × (1 − 0.081 − 0.000008) × 100}/0.9938 = 90.1 wt.%.

The amount of the extraneous matter contained in the final product is $\{0.8/(94.810 \times 0.919)\} \times 100 = 0.0009$ wt.%.

The amount of the extraneous matter removed is $\{(602.7 - 0.8)/602.7\} \times 100 = 99.87$ wt.%.

EXPERIMENT 2

The apparatus used had the same construction as the apparatus of Experiment 1 except that the spacing between the auxiliary parallel bars of strip steel was reduced to form lattice openings, 20 mm × 15 mm. Waste glass (86.51 kg) consisting of 99.57% by weight of bottles and sheet glass pieces and 0.43% by weight of caps, pull-top pieces and like extraneous matter was placed into the apparatus, which was then driven for 1.5 minutes as in Experiment 1. Table 2 shows the size distribution of the undersize material obtained and the amount of the extraneous matter contained therein, in comparison with those of the starting test material. The extraneous pieces in the undersize material were small planar pieces such as rings of pull-top pieces and cutout portions thereof as separated therefrom.

Table 2

| Size (mm) | Test material Whole | Test material Extraneous matter | Undersize material Whole | Undersize material Extraneous matter |
|---|---|---|---|---|
| +40 | 17.0 | 0.15 | — | — |
| −40 to +20 | 49.4 | 0.28 | — | — |
| −20 to +10 | 26.2 | 0.0043 | 68.6 | 0.0004 |
| −10 to +5 | 4.8 | — | 22.9 | — |
| −5 | 2.6 | — | 8.5 | — |
| Total % | 100.0 (86.51 kg) | 0.43 (372.9 g) | 100.0 (83.29 kg) | 0.0004 (0.3 g) |

The amount of the undersize material is $(83.29/86.51) \times 100 = 96.3$ wt.%.

When the −20 mm to +5 mm portion was collected as the final product, the amount of the glass recovered is $\{0.963 \times (1 - 0.085 - 0.000004) \times 100\}/0.9957 = 88.5$ wt.%.

The amount of the extraneous matter contained therein is $\{0.3/(83290 \times 0.915)\} \times 100 = 0.0004$ wt.%.

The amount of the extraneous matter are recover is $\{(372.9 - 0.3)/372.9\} \times 100 = 99.91$ wt.%.

Comparison between Experiment 1 and Experiment 2 shows that the latter conducted with a reduced spacing between the auxiliary parallel bars removed the extraneous matter much more effectively, although the percent glass recovery was slightly lower due to an increase in the amount of fine to small pieces.

In either case, the amount of the extraneous matter contained in the final product is extremely small. Moreover, since the extraneous pieces are singly separated from the glass pieces, they are readily completely removable by sink and float separation or by manual separation.

What we claim is:

1. A method of breaking up and separating waste glass to obtain cullet with use of a lattice comprising a grizzly made up of parallel bars arranged at a spacing smaller than the minimum width of projection of three-dimensional extraneous matter and auxiliary parallel bars disposed over one surface of the grizzly and arranged at right angles to the bars, the diagonal dimension of the openings of the lattice being smaller than the maximum width of projection of planar extraneous matter, the method comprising dropping the waste glass onto the grizzly surface of the lattice to break up the waste glass on the grizzly under gravity and to separate the waste glass into an undersize portion of the waste glass passing through the lattice and an oversize portion containing large pieces of waste glass and various kinds of unbroken extraneous matter, and repeatedly subjecting the oversize portion to the aforesaid operation to remove the resulting extraneous oversize material from the undersize glass material.

* * * * *